United States Patent [19]

Mzik

[11] Patent Number: 4,567,947
[45] Date of Patent: Feb. 4, 1986

[54] GELLATION OF PURE METHYL ALCOHOL

[75] Inventor: Joseph Mzik, Calgary, Canada

[73] Assignee: Canadian Fracmaster Ltd., Calgary, Canada

[21] Appl. No.: 531,937

[22] Filed: Sep. 13, 1983

[30] Foreign Application Priority Data

Sep. 17, 1982 [CA] Canada .................................. 411701

[51] Int. Cl.⁴ ............................................. E21B 43/26
[52] U.S. Cl. .................................... 166/308; 166/271; 166/273; 166/274; 166/275; 252/8.55 R; 252/315.01; 252/315.1
[58] Field of Search ...................... 252/8.55 R, 315.01, 252/315.1; 166/273, 274, 275, 271, 308

[56] References Cited

U.S. PATENT DOCUMENTS 3,747,681 7/1973 Davis, Jr. et al. .............. 252/8.55 R
3,836,465 9/1974 Rhudy et al. ........................ 166/308

Primary Examiner—A. Lionel Clingman
Assistant Examiner—Hoa Van Le
Attorney, Agent, or Firm—Lerner, David, Littenberg, Krumholz & Mentlik

[57] ABSTRACT

Underground formation fracturing compositions comprise a fracturing fluid composition for use in fracturing underground formations, such as oil or gas wells, comprising at least one substantially anhydrous aliphatic alcohol, a non-ionic homopolymer to form a gel with the alcohol and having a molecular weight from about 4 million to about 5 million, and as gel activating agent an alkali metal halide or an alkaline earth metal halide. A gel breaker comprising a salt containing iron or chromium, can be present.

28 Claims, 3 Drawing Figures

VISCOSITY- CONCENTRATION RELATIONSHIP
OF POLYOX RESINS IN METHANOL

FIG. I

APPARENT VISCOSITY AT HIGH RATES OF SHEAR

THE EFFECT OF TEMPERATURE
UPON THE VISCOSITY DEVELOPMENT

GELLATION OF PURE METHYL ALCOHOL

BACKGROUND OF THE INVENTION

This invention relates to compositions for use in fracturing formations such as oil or gas wells, to methods of making said compositions and to fracturing of underground formations using such compositions.

A process of hydraulic fracturing of an oil or gas well to improve its productivity is well known. Essentially the process involves the injection of a fluid down the wellbore and into the productive formation at sufficient rate and pressure that the formation rock fractures from the induced stresses. A proppant, such as sand or small particles of sintered bauxite, is added to the fluid and carried into the formation fracture. This proppant prevents closure of the fracture when hydraulic pressures are released, thereby leaving a conductive flow channel from the wellbore deep into the rock matrix.

Traditionally the fluid used for the purpose of hydraulic fracturing has been oil, water, or an emulsion of these two liquids. An efficient fracturing fluid should possess good proppant transport characteristics, which characteristics are related to the viscosity. Generally the viscosity should be high in achieving the goal of wider and larger fractures, for fluid loss and for efficient proppant transport. A wide range of additives are also used to enhance the rheological properties and/or the chemical properties of the fluid. Such additives include viscosifiers, friction reducing agents, surface active agents, fluid loss control additives and the like.

Recently, the application of aqueous methanol, either by itself or in conjunction with gases such as carbon dioxide or nitrogen, has been established due to certain advantageous properties of this fluid. Advantages of methanol include its low freezing temperature for use with liquid $CO_2$, compatibility with water-sensitive formations, and low surface tension for improved load fluid recovery.

A disadvantage of the use of methanol is that it has usually been found necessary to include a percentage of water to act as solvent for the gellants. The amount of water is usually in the range of from 10% by 25% by volume of the alcohol. Without this water, a satisfactory viscosity increase is not obtained with most natural gums or synthetic polymers. This produces difficulties in the case of those formations where water itself may be regarded as forming a blockage in the formation. The use of anhydrous or substantially anhydrous alcohol is desirable for some purposes but, to date no wholly satisfactory gellant for use in anhydrous alcohol has been found.

Attempts have been made to provide gellants for use in anhydrous alcohols. For example U.S. Pat. No. 3,954,626 discloses a well treating gel comprising substantially anhydrous lower alcohols gelled by the use of hydroxy propyl methyl cellulose. U.S. Pat. No. 4,012,327 discloses substantially anhydrous lower alcohols thickened but not necessarily gelled by the use of aminomethylated polyacrylamide of molecular weight up to around 1 million. This composition appears to be a simple thickened liquid not having the advantageous flow properties of non-Newtonian fluids, e.g. true gels.

SUMMARY OF THE INVENTION

The present invention aims to provide a fracturing fluid composition for use in underground formations such as oil or gas wells which mitigates or obviates disadvantages of previously known compositions.

Accordingly, it is an object of the invention to provide a fracturing fluid composition for use in fracturing underground formations, such as oil or gas wells, comprising at least one substantially anhydrous aliphatic alcohol, a nonionic homopolymer to form a gel with the alcohol and having a molecular weight from about 4 million to about 5 million, and as gel activating agent, an alkali metal halide or an alkaline earth metal halide.

It is a further object of the invention to provide a method of fracturing an underground formation such as an oil or gas well comprising injecting the formation with an effective amount of a fracturing fluid gel composition comprising, at least one substantially anhydrous aliphatic alcohol, a polymer or a nonionic homopolymer forming a gel with the alcohol and having a molecular weight from about 4 million to about 5 million, and as gel activating agent, an alkali metal halide or an alkaline earth metal halide; and applying pressure to the composition in the formation to induce fracture of the formation.

The invention further provides a method of making a fracturing fluid gel composition for use in fracturing underground formations such as oil or gas wells, comprising mixing at least one substantially anhydrous aliphatic alcohol with a polymer or a nonionic homopolymer having a molecular weight of from about 4 million to about 5 million at a temperature of at least 20° C. to permit initial swelling of the polymer and, thereafter mixing, as a gel activating agent, an alkali metal halide or an alkaline earth metal halide.

The lower aliphatic alcohol may conveniently be a $C_1$-$C_4$ alcohol for example, methyl, ethyl or isopropyl alcohol. The alcohol may be completely anhydrous but may contain a small amount of water, for example up to 5% by weight.

The homopolymer having a molecular weight from about 4 million to about 5 million is suitably a polyalkylene oxide, for example, poly(ethylene oxide). It may be used in an amount of from 0.1 to 3% by volume of the alcohol.

The activating agent may be a potassium, sodium, calcium or magnesium halide. The degree of gellation achievable may be dependent on the amount and particular activating agent chose. Potassium bromide in an amount of from 0.1 to 0.8% wt/v, especially in an amount of from 0.25 to 0.4% wt/v causes poly(ethylene oxide) to develop a smooth even gel in non-aqueous methanol having suitable viscosity for proppant transport.

Since fracturing fluids are generally non-Newtonian and exhibit a high degree of pseudoplasticity, their viscosities are dependent upon the shear rate. An important consideration in the use of polymers as additives to a hydraulic fracturing fluid is the determination of the quantity of polymer to add to the fluid to yield a certain viscosity under the actual shear conditions of the treatment.

The drawings illustrate, for exemplary compositions of the invention in which the homopolymer is poly(ethylene oxide), the alcohol is methanol and the activating agent is potassium bromide, considerations of viscosity according to concentration of components, shear rate under treatment and development of viscosity in making the compositions.

DESCRIPTION OF PREFERRED EMBODIMENTS

Figure 1:
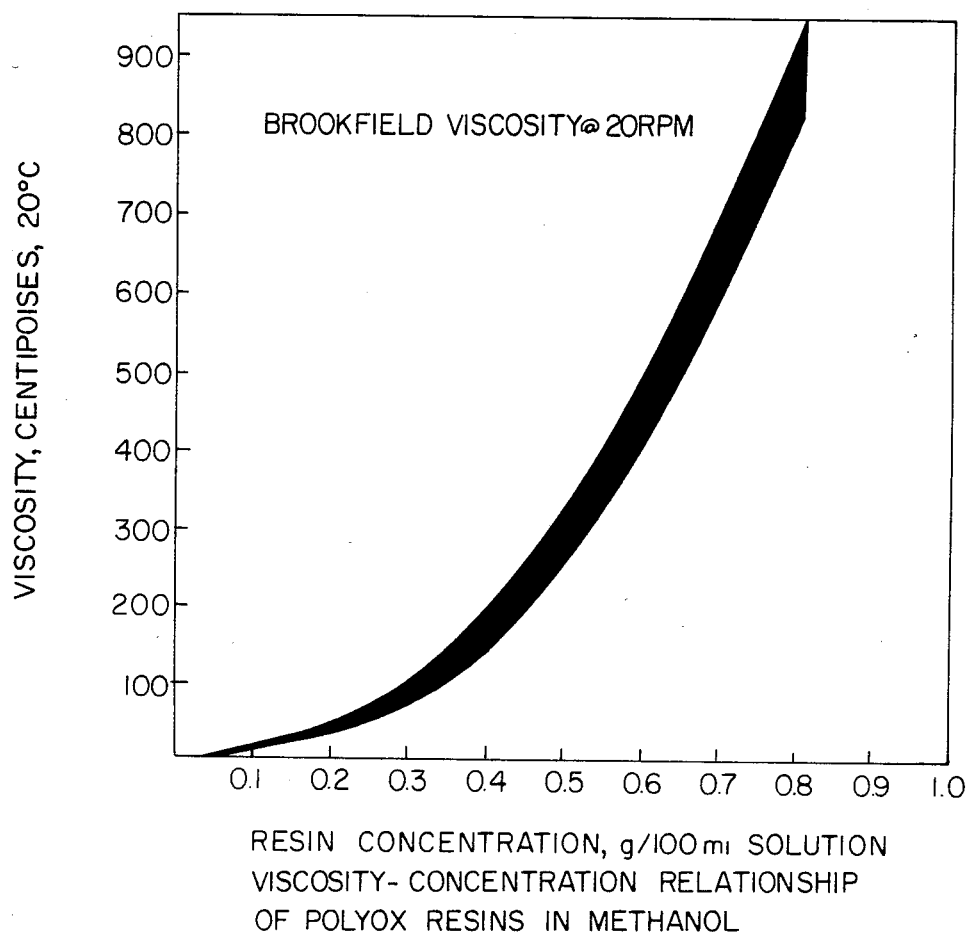
FIG. 1 is a graph of the viscosity plotted against the polymer concentration.
Figure 2:
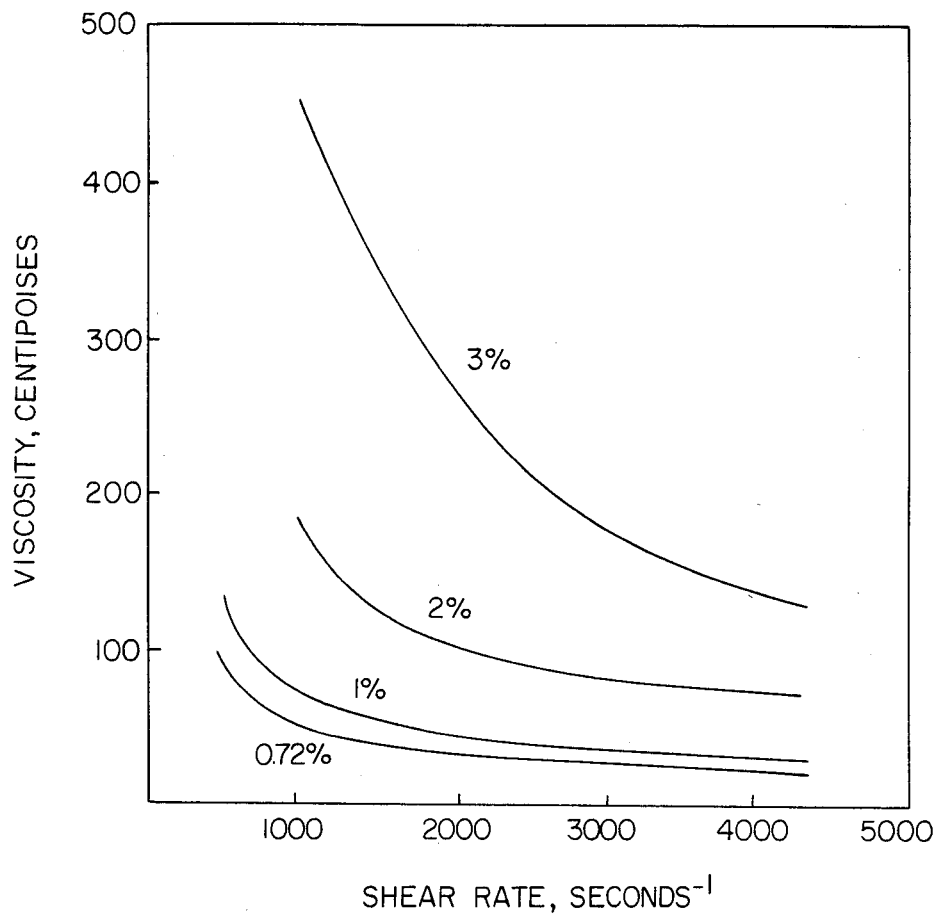
FIG. 2 is a graph of the viscosity plotted against the shear rate under well treatment conditions.

As can be seen from FIG. 1, the viscosity increases as the concentration of poly(ethylene oxide) in methanol increases and the rate of shear is inversely proportional to the measured viscosity.

Figure 3:
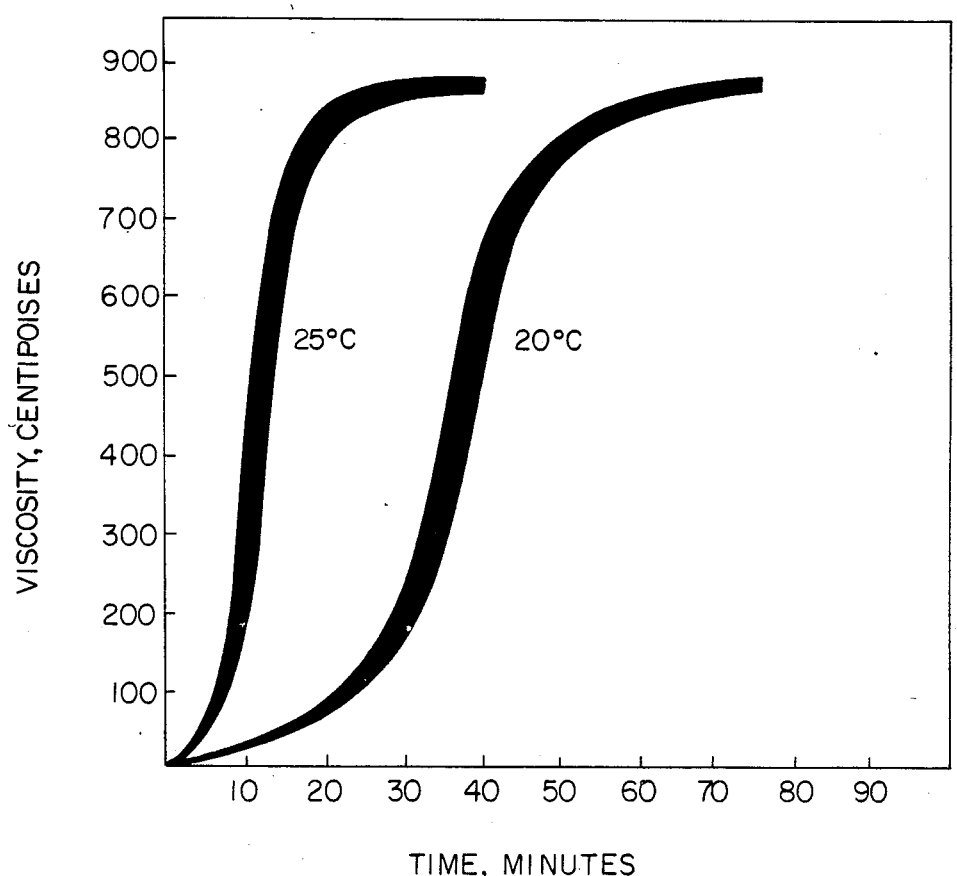
FIG. 3 is a graph showing the effect of temperature on viscosity development of an exemplary composition.

In a typical application, the required polymer concentration (0.1–3.0% wt/v) in methanol can be determined from FIG. 1. The polymer is premixed in methanol at the temperature 20°–25° C. for 5–10 minutes when the initial swelling of polymer occurs. No appreciable viscosity develops during this period. The temperature should not be lower than 20° C. for this operation to progress. The corresponding amount of activating agent (0.1 to 0.8% wt/v) is added into the tank while mixing. The mixing time (usually 30–35 minutes) is related to the temperature and agitation. The effect of the temperature on the solubility of polymer at a constant mixing is shown in FIG. 3.

Once the fracturing fluid has completed its function of transporting the proppant into the induced crack in the productive formation, the well is usually returned to production. At this time, any viscosity remaining in the fluid impedes the flow of the fluid and its subsequent recovery from the well. To improve this flow back of load fluids, gel breakers may be added to the fluids. The gel breakers act to reduce the viscosity of the gel after the fracturing is completed.

The viscosity reduction can be achieved by the addition of certain chemicals and can be affected by various environmental conditions. Solutions of poly(ethylene oxide) are subject to oxidative attack which results in a degradation of the polymer. The degradation is accelerated by certain heavy metal ions, oxidizing agents and strong acids. The polymer degrades by oxidation forming hydroperoxides that decompose and cause polymer chain cleavage. Nitrogen and oxygen atmospheres also increase the degradation rate. The experimental data on degradation rates of various solutions of gelled methanol were measured by means of the relative rate of decrease of the specific viscosity. The general degradation characteristics had to be modified to obtain a guidance for the field application. By taking the environmental factors into consideration a controlled degradation rate can be achieved by the application of required ratios of a breaker corresponding to the initial viscosity of the fracturing fluid and the chosen time needed for the complete breakdown of the polymer.

A gel breaker which is used in accordance with the present invention may be a salt comprising iron or chromium ion. The gel breaker and amount thereof is suitably chosen in dependence on the desired time for total breakdown. Such time may suitably be from 2 to 16 hours. For this purpose a 2% solution of sodium dichromate in methanol may be suitable. This solution may be used in an amount of from 0.5 to 6 liters per cubic meter of gel.

For most breakers, the nonaqueous solvents such as primary and secondary alcohols are more effective than water in retarding the loss of fluid viscosity. Alcohols are oxidized at a greater rate than the polymer and act as stabilizers.

In use a composition according to the invention is injected into a well and pressure is applied to induce fracture. The composition may include a proppant to hold open the induced fracture.

The compositions of the invention may be mixed with liquid carbon dioxide for injection into the well. The carbon dioxide may be present in a concentration of from 40 to 80% of the carbon dioxide-gel mixture.

The compositions of the invention may be injected into the well together with gaseous nitrogen. In this case the gaseous nitrogen may occupy 60 to 90% by volume of the space occupied by the gaseous nitrogen and gel together under fracturing conditions.

I claim:

1. A fracturing fluid composition for use in fracturing underground formations penetrated by a well bore, comprising:
   (1) a major amount of at least one lower aliphatic alcohol which is anhydrous or has a water content not exceeding about 5% by volume,
   (2) a minor amount of a polyalkylene oxide homopolymer having a molecular weight from about 4 million to about 5 million and being present in an amount effective to form a gel with the alcohol, and
   (3) as gel activating agent, a minor amount of an alkali metal halide or an alkaline earth metal halide in an amount effective to activate gellation of the composition.

2. A fracturing fluid composition as claimed in claim 1 in which the alcohol is methyl, ethyl or isopropyl alcohol.

3. A composition as claimed in claim 1 in which the homopolymer is poly(ethylene oxide).

4. A composition as claimed in claim 1 in which the activating agent is a potassium, sodium, calcium or magnesium halide.

5. A composition as claimed in claim 4 in which the activating agent is potassium bromide present in an amount of from 0.1 to 0.8% by weight based on the volume of the composition.

6. A composition as claimed in claim 5 in which the potassium bromide is present in amount of from 0.25 to 0.4% by weight based on the volume of the composition.

7. A composition as claimed in claim 1, in which the homopolymer is mixed with the alcohol in a concentration of from 0.1 to 3.0% by weight per volume of alcohol.

8. A composition as claimed in claim 1 including a gel breaker which acts over a time period to degrade the homopolymer and thereby reduce the viscosity of the gel.

9. A composition as claimed in claim 8 in which the gel breaker is a salt containing iron or chromium.

10. A composition as claimed in claim 8 in which the gel breaker and amount thereof are chosen to break down the polymer within a chosen time period.

11. A composition as claimed in claim 10 in which the chosen time period is from 2 to 16 hours.

12. A composition as claimed in claim 9 in which the gel breaker is sodium dichromate.

13. A composition as claimed in claim 12 in which the concentration of sodium dichromate is 0.5 to 6 liters of 2% solution of sodium dichromate in methanol per cubic meter of gel.

14. A composition as claimed in claim 1 admixed with proppant.

15. A composition as claimed in claim 14 in which the proppant is sand or sintered bauxite.

16. A method of fracturing an underground formation penetrated by a well bore, comprising:
   (1) injecting the formation with an effective amount of a fracturing fluid gel composition comprising:
   at least one lower aliphatic alcohol, which is anhydrous or has a water content not exceeding about 5% by volume,
   a polyoxyalkylene oxide homopolymer having a molecular weight from about 4 million to about 5 million and present in an amount effective to form a gel with the alcohol, and as a gel activating agent, an alkali metal halide or an alkaline earth metal halide in an amount effective to activate gellation of the composition, and a gel breaker which acts over a time period to degrade the polymer and thereby reduce the viscosity of the gel; and
   (2) applying pressure to the composition in the formation to induce fracture of the formation.

17. A method as claimed in claim 16 in which the alcohol is methyl, ethyl or isopropyl alcohol.

18. A method as claimed in claim 16 in which the homopolymer is poly(ethylene oxide).

19. A method as claimed in claim 16 in which the activating agent is a potassium, sodium, calcium or magnesium halide.

20. A method as claimed in claim 16 in which the gel breaker is a salt containing iron or chromium.

21. A method as claimed in claim 16 in which liquid carbon dioxide is injected into the formation mixed with the gel.

22. A method as claimed in claim 21 in which the liquid carbon dioxide is present in a concentration of from 40 to 80% of the carbon dixoide-gel mixture.

23. A method as claimed in claim 16 in which gaseous nitrogen is injected into the formation together with the gel.

24. A method as claimed in claim 23 in which the gaseous nitrogen occupies 60 to 90% by volume of the space occupied by the gaseous nitrogen and gel together under formation fracturing conditions.

25. A method of making a fracturing fluid gel composition for use in fracturing an underground formation penetrated by a well bore, comprising
   mixing at least one lower aliphatic alcohol which is anhydrous or has a water content not exceeding about 5% by volume, with a polyalkylene oxide homopolymer having a molecular weight of from about 4 million to about 5 million at a temperature of at least 20° C. to permit initial swelling of the polymer, the amount of said homopolymer being effective to form a gel with the alcohol, and
   thereafter mixing in, as a gel activating agent, an alkali metal halide or an alkaline earth metal halide in an amount effective to activate gellation of the composition.

26. A method as claimed in claim 25 in which the alcohol is methyl, ethyl or isopropyl alcohol.

27. A method as claimed in claim 25 in which the homopolymer is a poly(ethylene oxide).

28. A method as claimed in claim 25 in which the activating agent is a potassium, sodium, calcium or magnesium halide.

* * * * *